(12) United States Patent
Harris

(10) Patent No.: US 8,201,356 B2
(45) Date of Patent: *Jun. 19, 2012

(54) ICE FISHING DEVICE FOR PROTECTING A FISHING LINE

(75) Inventor: Gary G. Harris, Matteson, IL (US)

(73) Assignee: Gary G. Harris, Macomb, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/660,476

(22) Filed: Feb. 26, 2010

(65) Prior Publication Data

US 2010/0180487 A1    Jul. 22, 2010

(51) Int. Cl.
*A01K 97/01* (2006.01)

(52) U.S. Cl. .................................. 43/4; 43/15

(58) Field of Classification Search ............... 43/4, 15; A01K 97/01
See application file for complete search history.

(56) References Cited

U.S. PATENT DOCUMENTS

| | | | | |
|---|---|---|---|---|
| 2,786,294 A * | 3/1957 | Whitacre | ............. | 43/17 |
| 2,838,196 A * | 6/1958 | Chapman | ............. | 220/327 |
| 2,914,926 A * | 12/1959 | Meagher | ............. | 138/156 |
| 3,056,272 A * | 10/1962 | Eilers | ............. | 249/79 |
| 3,059,451 A * | 10/1962 | Anderson | ............. | 249/66.1 |
| 3,134,186 A * | 5/1964 | Krueger | ............. | 43/17 |
| 3,387,401 A * | 6/1968 | Stelmach | ............. | 43/17 |
| 3,464,137 A * | 9/1969 | England | ............. | 43/4 |
| 3,507,268 A * | 4/1970 | Anderson | ............. | 126/271.3 |
| 3,722,940 A * | 3/1973 | Misjak | ............. | 294/1.1 |
| 3,999,322 A * | 12/1976 | Kooker | ............. | 43/4 |
| 4,270,297 A * | 6/1981 | Yates | ............. | 43/4 |
| 4,447,978 A * | 5/1984 | Robison | ............. | 43/10 |
| 4,747,226 A * | 5/1988 | Todd | ............. | 43/4 |
| 4,761,909 A * | 8/1988 | Christian et al. | ............. | 43/4 |
| 4,765,083 A * | 8/1988 | Wilkins | ............. | 43/26 |
| 4,949,497 A * | 8/1990 | Lindell | ............. | 43/17 |
| 5,024,757 A * | 6/1991 | Malak | ............. | 210/136 |
| 5,048,220 A * | 9/1991 | Harris | ............. | 43/4 |
| 5,491,923 A * | 2/1996 | Zingrone | ............. | 43/17 |
| 6,684,553 B1 * | 2/2004 | Holum | ............. | 43/4 |
| 6,694,662 B1 * | 2/2004 | McClure | ............. | 43/4 |
| 6,907,689 B2 * | 6/2005 | Pendzimas | ............. | 43/4 |
| 7,162,826 B1 * | 1/2007 | Zander et al. | ............. | 43/4 |
| 7,494,300 B2 * | 2/2009 | Blank | ............. | 405/259.1 |
| 2002/0095849 A1* | 7/2002 | Shook | ............. | 43/4 |
| 2005/0034348 A1* | 2/2005 | Grahl et al. | ............. | 43/17 |
| 2006/0213115 A1* | 9/2006 | Hubscher et al. | ............. | 43/44.9 |
| 2007/0169395 A1* | 7/2007 | Rayfield | ............. | 43/17 |

* cited by examiner

*Primary Examiner* — Kimberly Berona
*Assistant Examiner* — Marisa Conlon
(74) *Attorney, Agent, or Firm* — Carmen Patti Law Group, LLC

(57) ABSTRACT

An ice fishing line protection device, for protecting micro fishing line as light as one or two pound test, comprising an elongated tube with an internal passageway through which a fishing line may pass. The protection device floats in an ice fishing hole protecting the line from abrasions. The protection device opens to release the line or it can be extracted from the ice hole entirely when a fish is caught.

17 Claims, 5 Drawing Sheets

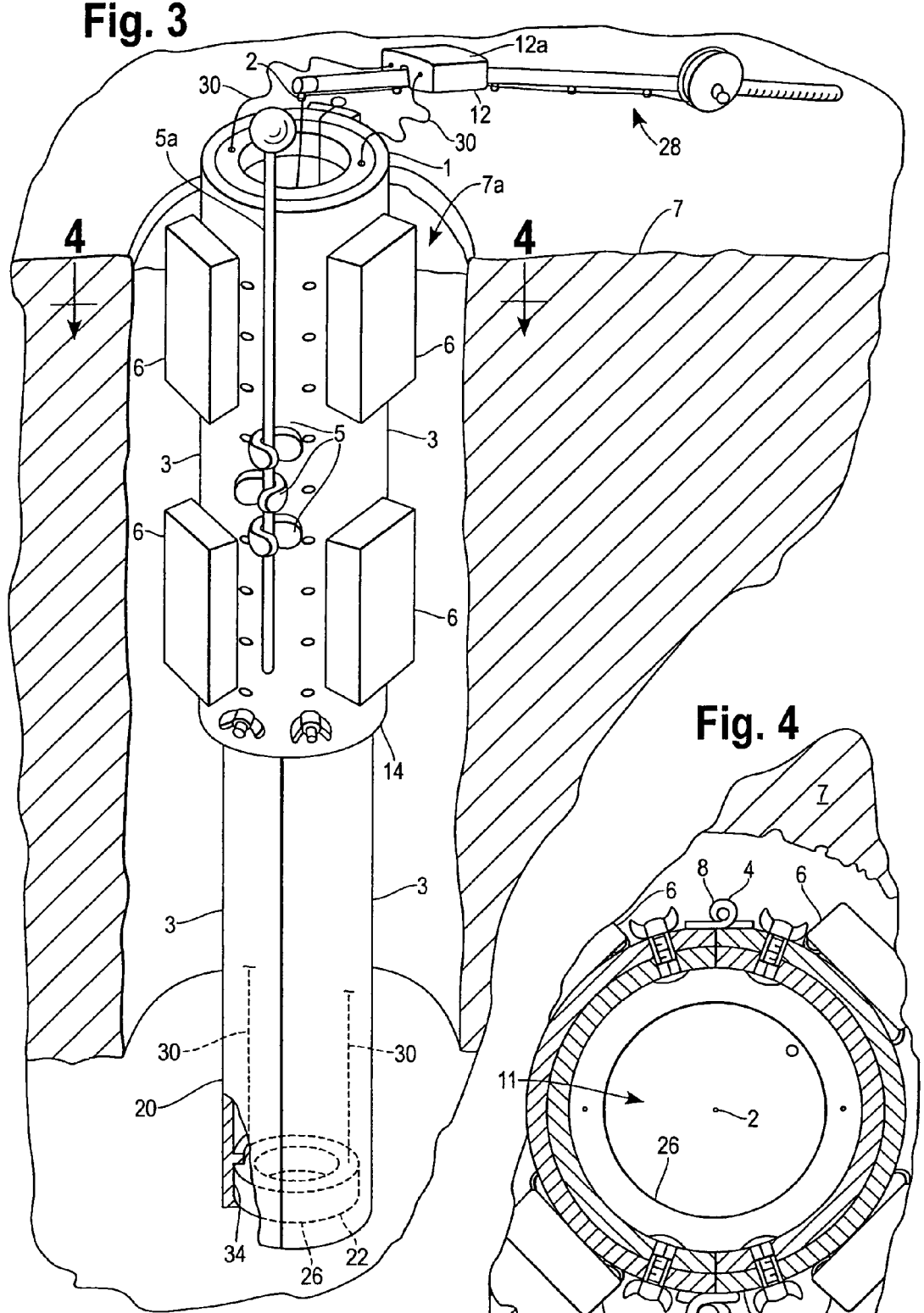

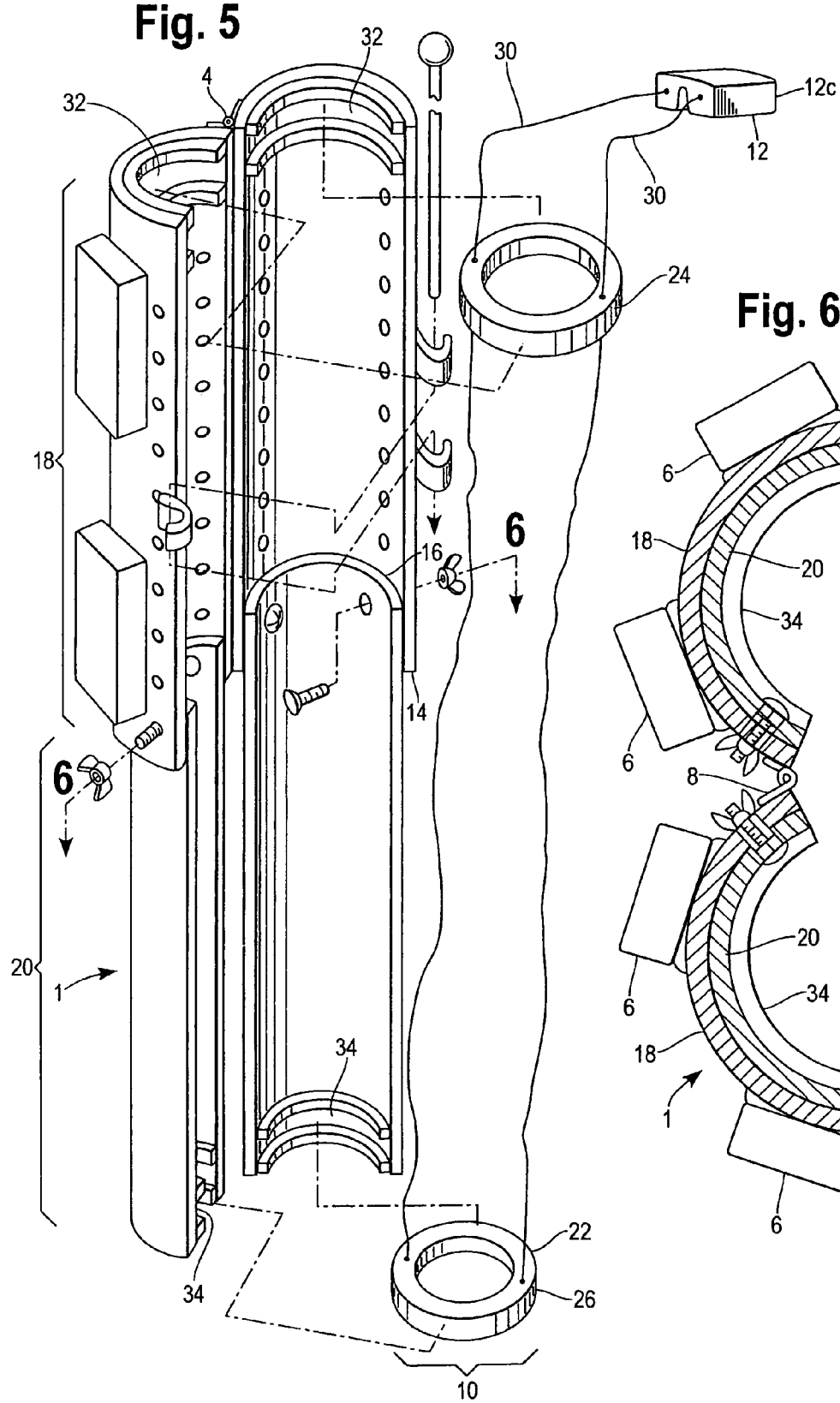

ICE FISHING DEVICE FOR PROTECTING A FISHING LINE

TECHNICAL FIELD

The present invention relates in general to the art of ice fishing, and it relates in particular to novel devices which prevent the fishing line from being abraded by a peripheral edge of a hole in a sheet of ice and other ice surfaces.

BACKGROUND

Ice fishing is something that many people want to try. But what equipment is needed? The basics include a bucket, some line and books and an auger. However, most ice fisherman want all the stuff they can get, and a sled to haul it all on. Walleye and perch are often caught through the ice, but bass, catfish, crappie and bream also bite when their world is frozen over. Ice fishing is made appealing to a broad sector of the fishing world through fisherman TV shows showing big fish being pulled through holes that look too small.

Many areas offer ice fishing opportunities for perch, sunfish, walleye, crappie, whitefish, and trout, as potential quests. It depends on what is in season and where. Indeed, fish, when caught from the frigid ice cold water, are at the year's best, with the flesh firm and flaky. It is during the winter that most ardent anglers regard fish as the best tasting, not having the muddy flavor from waters, which are quite warm during summer months.

An ice fisherman may have to drill ten to fifteen holes, fishing each hole about fifteen minutes, before finally hitting a good fishing area. Once the fish are found, you obviously stay there. If a number of holes are drilled, the ice fisherman can return to any of them, retrying some of the holes a bit later. Fish may have moved in to the hole area or the act of boring the hole may spook the fish away. Retrying a previously drilled hole may be what's needed to locate fish, especially if other anglers in the same area are catching fish.

There are a variety of types of equipment that are used for ice fishing. Generally either stationary lines or jigging lines are used. The simplest form of stationary line is the set-line. A two to three foot slender willow or dogwood branch is anchored in the frozen slush so that the smaller tip is centered over the hole. After attaching a small elastic to your line by means of a couple of loops, it will be hung near the tip of your branch or twig. A minnow is then suspended under a sinker about one to five feet off bottom. If a fish hits, the elastic cushions the strike and pops off the branch. After the fish is landed, the elastic will hold the bait at exactly the previous depth. Floats can also be used to hold a minnow off bottom. Some fisherman like to keep their bait moving all the time ("jigging")—gently allowing their bait to go right to the bottom, and allowing it to stay there for several minutes. After several minutes, lines are 'triggered', then after a few minutes, if nothing is happening, lines are raised up to a new depth, about four feet higher and the process is repeated until the bait is right up to and nearly into the hole. Trying this whole procedure a couple of times in a given location provides a proper depth to catch fish. Once success strikes, returning the bait to the same depth will continue the success—as this is where the fish are. They often 'suspend' at a given depth, and may not be above, or below this depth. Fish often show an orientation to the bottom. In general, speckled trout are found in 5 to 15 feet of water, walleye and pike in 5 to 30 feet and lake trout and whitefish in 30 to 80 feet. A sonar unit can be an important piece of ice fishing equipment. Moreover, good locations will produce fish, year after year. Purchasing a portable G.P.S. will allow the coordinates to be saved for future use.

Tip-ups provide the opportunity to move the bait as well as detecting a strike. Commercial tip-ups usually have a small reel to hold the line and a flag mechanism to indicate the presence of a fish. Most ice fishermen use line in the range of 8 to 14 pound test. Since the ice hole can be abrasive, it makes sense to use line of approximately two pounds greater strength than you would use in warm water conditions. A problem arises with using thicker line as it becomes more visible to the fish in the clearer, non-muddy waters and diminishes the catch. The instant device is most favorably designed to protect micro fishing line as light as one or tow pound test.

To alleviate this problem, and others which will become apparent from the disclosure which follows, the present invention conveniently relates to a novel ice fishing device for protecting a fishing line from being abraded by a peripheral edge of an ice hole. Ice fishermen encounter a problem with line wear and breakage caused by dragging the fishing line across sharp edges of the ice as the fish pulls the line under the ice. This problem is particularly acute while fighting relatively large game fish. Thus, a length of the protective tube is selected that extends some distance below the bottom of the ice layer to provide a guard for protecting the line from the sharp edges of the ice. In this regard, the tube is preferably made of variable length to fit varying ice conditions and eliminate the need to cut the tube to a desired length.

According to one embodiment, an ice fishing line anti-abrasion system is provided for protecting an ice fishing line from abrasion by an ice hole. The device comprises an upper annular ring and a lower annular ring, both annular rings being interconnected to each other and to a pole connector, and an extendable elongated tube.

Each annular ring has a hole for receiving the ice fishing line. The tube has a top end and a bottom end. The tube has a means for floatation disposed on an exterior surface thereof. The tube may comprise two elongated half tubes, each with semicircular cross-section, and fastened together on one side with at least one longitudinal hinge and on the other side with a quick release locking mechanism. The tube has a biasing means to open the other side when the quick release locking mechanism is actuated. Each of the half tubes has a half annular recess proximate the top end and a half annular recess proximate the bottom end. Each annular recess proximate the top end being adapted for receiving the upper annular ring, and each annular recess proximate the bottom end being adapted for receiving the lower annular ring.

Thus, the ice fishing line can be threaded through the upper annular ring and the lower annular ring, the upper annular ring and the lower annular ring can be disposed in one of the half annular recesses proximate the top end and the half annular recesses proximate the bottom end. The two elongated half tubes can be closed together and secured with the quick release locking mechanism. The closed extendable elongated tube can be inserted into the ice hole and floated in the water in the ice hole and the fishing line can be raised and lowered as needed to facilitate fishing activity. The quick release locking mechanism can be actuated to open the tube, whereupon the annular rings and the fishing line can be removed from the tube upon a fish strike. Supplementally, a pole connector, in contact with a fishing pole, can be employed which is flexibly attached to the annular rings. Pulling up on the fishing pole can engage the tube that is connected to the annular rings and extract the entire ice fishing device for protecting a fishing line from the water upon a fish strike.

ADVANTAGES

The ice fishing line protection device invention can be used in a number of ways to protect an ice fishing line from abrasions. First, using a tube that is floatable in an ice hole will substantially diminish abrasions from the peripheral wall of the ice hole itself. Moreover, since it is designed to have the bottom of the tube extend at or below the bottom surface of the ice, abrasions from the sharp edges of the ice on the bottom of an ice sheet can be minimized. Additionally, since the top end of the tube is buoyantly maintained at an elevation at least as high as the top surface of the sheet of ice abrasions from the upper rim of the ice hole are diminished.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY

According to one aspect of the invention, an ice fishing line protection device is taught comprising an elongated tube with a top end, a bottom end, and an internal passageway extending from the top end to the bottom end through which a fishing line may pass. The device includes buoyancy means attached to the tube for maintaining the top end of the tube in an elevated position relative to the bottom end while the tube is disposed in water and means for extracting the tube from a hole in a sheet of ice that is filled with water. The means for extracting includes a linkage extending upwardly from the tube disposed in the hole. The linkage is accessible to a fisherman on top of the sheet of ice and has a pole connector that engages a fishing pole of the fisherman so that the tube can be extracted from the hole in the sheet of ice that is filled with water upon the fishing pole being pulled away from the hole with the pole connector engaged thereto.

According to another embodiment, an ice fishing line protection device comprises an elongated tube of variable length with a top end and a bottom end. The tube has an internal passageway extending from the top end to the bottom end through which a fishing line may pass. The tube has a top segment comprising two top longitudinal sections extending from the top end to a first medial end. Each of the two top longitudinal sections has a first longitudinal side edge and a second longitudinal side edge: the first longitudinal side edge of one of the two top longitudinal sections is pivotally joined with the second longitudinal side edge of the other of the two top longitudinal sections, and the second longitudinal side edge of the one of the two top longitudinal sections is reversibly connected to the first longitudinal side edge of the other of the two longitudinal sections.

The tube further has a bottom segment comprising two bottom longitudinal sections extending from a second medial end to the bottom end, each of the two bottom longitudinal sections have a first longitudinal side edge and a second longitudinal side edge. The first longitudinal side edge of one of the two bottom longitudinal sections is pivotally joined with the second longitudinal side edge of the other of the two longitudinal sections. The second longitudinal side edge of the one of the two bottom longitudinal sections is reversibly connected to the first longitudinal side edge of the other of the two longitudinal sections. One of the top segment and bottom segment is slidably nested at least partially in the other of the top segment and bottom segment.

Biasing means for urging each of the second longitudinal side edges of the one of the two top longitudinal sections and the one of the two bottom longitudinal sections away from each of the first longitudinal side edges of the other of the two top longitudinal sections and the other of the two bottom longitudinal sections for opening the two top longitudinal sections and the two bottom longitudinal sections to an open position are further included, as well as buoyancy means for maintaining the top end of the tube in an elevated position relative to the bottom end while the tube is disposed in water. Means for reversibly connecting the second longitudinal side edge of the one of the two longitudinal sections to the first longitudinal side edge of the other of the two longitudinal sections are provided. The means for reversibly connecting comprises an actuator that is accessible to a fisherman on top of a sheet of ice so that when the actuator is engaged by the fisherman the second longitudinal side edge of the one of the two longitudinal sections is disconnected from the first longitudinal side edge of the other of the two longitudinal sections.

In this way, the second longitudinal side edge of the one of the two top longitudinal sections can be disconnected from the first longitudinal side edge of the other of the two top longitudinal sections and the second longitudinal side edge of the one of the two bottom longitudinal sections can be disconnected from the first longitudinal side edge of the other of the two bottom longitudinal sections, the first longitudinal side edge of one of the two top longitudinal sections can be urged by the biasing means to pivot relative to the second longitudinal side edge of the other of the two top longitudinal sections and the first longitudinal side edge of one of the two bottom longitudinal sections can be urged by the biasing means to pivot relative to the second longitudinal side edge of the other of the two bottom longitudinal sections to open the elongated tube to allow a fishing line to be reversibly disposed between the longitudinal sections, the first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube with the fishing line disposed in the passageway, the tube can be extended so that the distance from the top end to the bottom end is at least as large as a thickness of a sheet of ice in which a hole is cut for ice fishing, and the bottom end of the tube with the fishing line disposed in the passageway can be inserted into the hole in the sheet of ice that is filled with water from a body of water under the ice, for ice fishing, with the top end of the tube buoyantly maintained at an elevation at least as high as the top surface of the sheet of ice and the bottom end of the tube buoyantly maintained at an elevation at or below the bottom surface of the sheet of ice to protect the fishing line from abrasion from the peripheral edge of the hole in the sheet of ice.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Embodiments constructed in accordance with the principles herein are illustrated by way of example, and not by way of limitation, in the figures of the accompanying drawings and in which like reference numerals refer to similar elements and in which:

FIG. 3 is a fishing line protection device of variable length with means for interlocking to secure a predetermine extended length;

FIG. 4 is a cross sectional view taken along the line 4-4 of FIG. 3, showing the buoyancy flotation devices as part of the tube, means for interlocking a top segment of the tube with a bottom segment, and also showing a spring biasing means attaching to one side of the device and a reversible connection means on the other side;

FIG. 5 is an exploded view of the device of FIG. 3 with the tube in an open position and with the means for extracting comprising a pole holder interconnected to a top annular ring and a bottom annular ring that have been exploded away from said open tube, also shown are the annular recesses on the interior surfaces of the tube which receive the respective annular rings;

FIG. 6 is a cross sectional taken along the line 6-6 of FIG. 5 with the actuator that secures the means for reversibly connecting the respective portions of a hollow cylinder removed (not shown) and showing the means for interlocking securing the inner bottom segment to the top segment;

DETAILED DESCRIPTION

Figure 1:
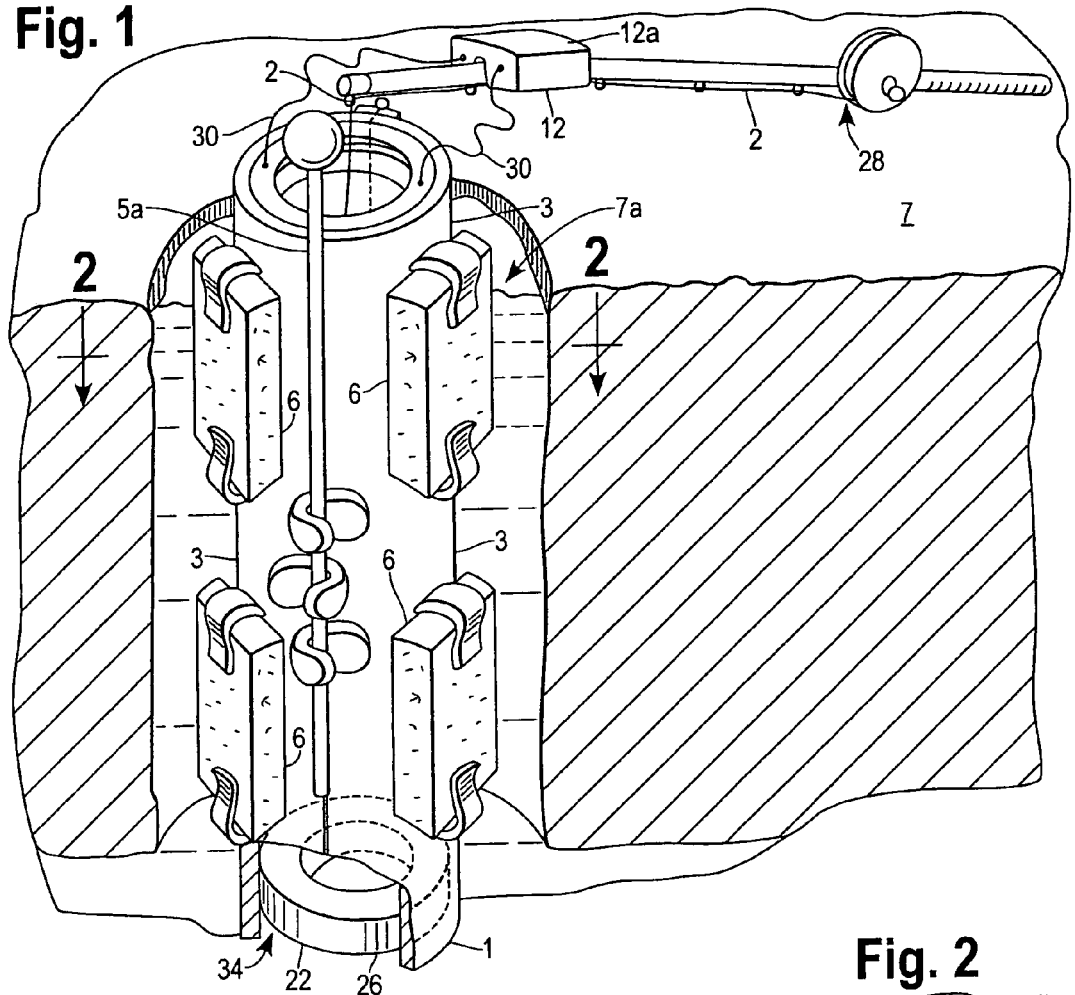
FIG. 1 is a perspective view of an fishing line protection device comprising an openable tube with a locking mechanism for keeping the tube closed and a buoyancy flotation device for supporting the device in water, showing also a pole connector extending from the tube and attached to a fishing rod to allow a fisherman to extract the device from the water.
Figure 2:
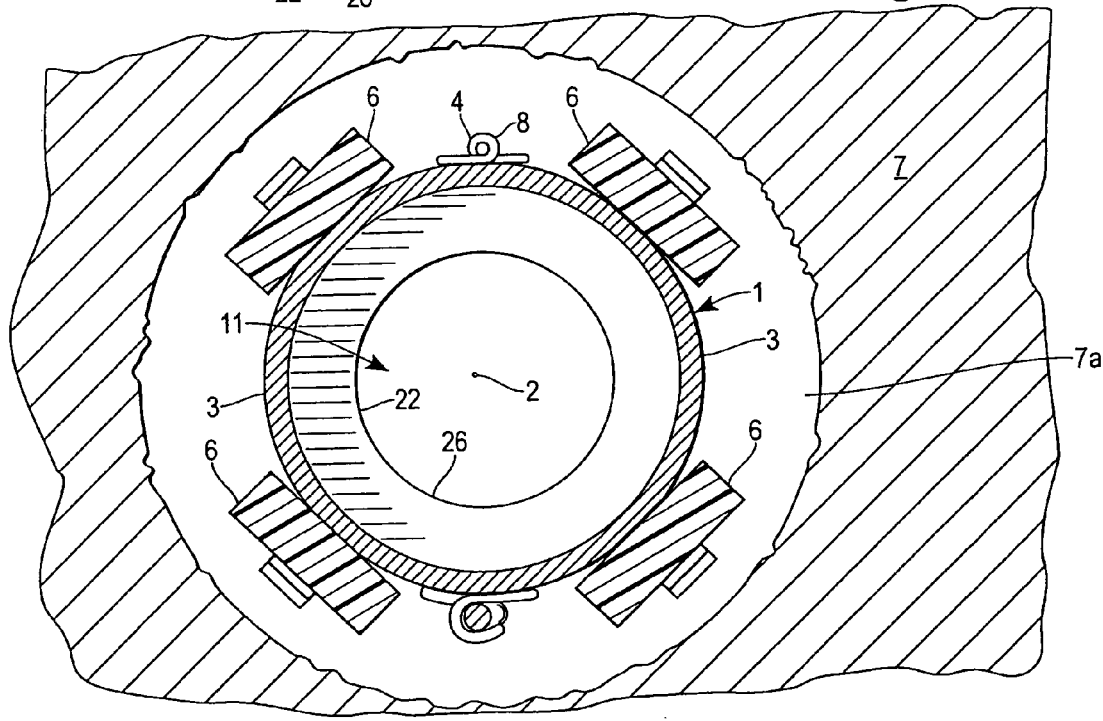
FIG. 2 is a cross sectional view taken along the line 2-2 of FIG. 1, showing the buoyancy flotation devices attached to the tube and also showing a spring biasing means attaching to one side of the device and a reversible connection means on the other side.

In the following description, specific details are set forth in order to provide a thorough understanding of the invention. However, it will be apparent that the invention may be practiced without these specific details. Without departing from the generality of the invention disclosed herein and without limiting the scope of the invention, the discussion that follows, will refer to the invention as depicted in the drawing.

According to one embodiment of the present invention an ice fishing line protection device comprising an elongated tube 1 with a top end 1a and a bottom end 1b is disclosed. The tube 1 has an internal passageway 11 extending from the top end 1a to the bottom end 1b through which a fishing line 2 may pass. The tube 1 has two longitudinal sections 3 extending from the top end 1a to the bottom end. Each of the two longitudinal sections 3 has a first longitudinal side edge and a second longitudinal side edge, respectively, a longitudinal side edge 9. The first longitudinal side edge of one of the two longitudinal sections 3 is pivotally joined with the second longitudinal side edge of the other of the two longitudinal section, and the second longitudinal side edge of the one of the two longitudinal sections 3 is reversibly connected to the first longitudinal side edge of the other of the two longitudinal sections 3. One or more hinges 4, including but not limited to living hinges, and the like, may be used for pivotally joining the two longitudinal sections 3.

The tube 1 further has means for reversibly connecting 5 the second longitudinal side edge of the one of the two longitudinal sections 3 to the first longitudinal side edge of the other of the two longitudinal sections and buoyancy means 6 for maintaining the top end of the tube 1 in an elevated position relative to the bottom end 1b while the tube 1 is disposed in water. The means for reversibly connecting comprises an actuator 5a that is accessible to a fisherman on top of a sheet of ice 7 so that when the actuator is engaged by the fisherman the second longitudinal side edge of the one of the two longitudinal sections is disconnected from the first longitudinal side edge of the other of the two longitudinal sections 3. The tube 1 also has biasing means 8 for urging the second longitudinal side edge of the one of the two longitudinal sections 3 away from the first longitudinal side edge of the other of the two longitudinal sections for opening the two longitudinal sections.

In this way, the second longitudinal side edge of the one of the two longitudinal sections can be disconnected from the first longitudinal side edge of the other of the two longitudinal sections 3, the first longitudinal side edge of one of the two longitudinal sections can be urged by the biasing means 8 to pivot relative to the second longitudinal side edge of the other of the two longitudinal sections to open the elongated tube 1 to allow a fishing line 2 to be reversibly disposed between the two longitudinal sections, the first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube 1 with the fishing line 2 disposed in the passageway, and the bottom end 1b of the tube 1 with the fishing line disposed in the passageway can be inserted into the hole 7a in the sheet of ice 7 that is filled with water from a body of water under the ice, for ice fishing, with the top end of the tube 1 buoyantly maintained in an elevated position relative to the bottom end 1b and with the fishing line protected from abrasion from a peripheral edge of the hole 7a in the sheet of ice 7.

Preferably, means for extracting 10 the tube 1 from the hole 7a in the sheet of ice that is filled with water is provided. The means for extracting includes a linkage 10a extending upwardly from the tube 1 disposed in the hole 7a. The linkage 10a is accessible to the fisherman on top of the sheet of ice 7, so that the tube 1 can be extracted from the hole 7a in the sheet of ice that is filled with water upon the linkage 10a is pulled away from the hole 7a.

According to one embodiment, an ice fishing line protection device comprises an elongated tube 1 with a top end 1a and a bottom end 1b. The tube 1 has an internal passageway 11 extending from the top end to the bottom end through which a fishing line 2 may pass. The tube 1 has two longitudinal sections 3 extending from the top end to the bottom end, and each of the two longitudinal sections 3 has a first longitudinal side edge and a second longitudinal side edge. The first longitudinal side edge of one of the two longitudinal sections is pivotally joined with the second longitudinal side edge of the other of the two longitudinal section. The second longitudinal side edge of the one of the two longitudinal sections is reversibly connected to the first longitudinal side edge of the other of the two longitudinal sections. Means for reversibly connecting the second longitudinal side edge of the one of the two longitudinal sections to the first longitudinal side edge of the other of the two longitudinal sections is provided. The means for reversibly connecting 5 comprises an actuator 5a that is accessible to a fisherman on top of a sheet of ice 7, so that when the actuator is engaged by the fisherman the second longitudinal side edge of the one of the two longitudinal sections is disconnected from the first longitudinal side edge of the other of the two longitudinal sections.

Biasing means 8 for urging the second longitudinal side edge of the one of the two longitudinal sections away from the first longitudinal side edge of the other of the two longitudinal sections for opening the two longitudinal sections 3 and buoyancy means 6 for maintaining the top end of the tube 1 in an elevated position relative to the bottom end while the tube 1 is disposed in water are further included. Whereby, the second longitudinal side edge of the one of the two longitudinal sections can be disconnected from the first longitudinal side edge of the other of the two longitudinal sections, the first longitudinal side edge of one of the two longitudinal sections can be urged by the biasing means 8 to pivot relative to the second longitudinal side edge of the other of the two longitudinal sections to open the elongated tube 1 to allow a fishing line 2 to be reversibly disposed between the two longitudinal sections 3, first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube 1 with the fishing line 2 disposed in the passageway, and the bottom end 1b of the tube 1 with the fishing line disposed in the passageway can be inserted into the hole in the sheet of ice 7 that is filled with water from a body of water under the ice, for ice fishing, with the top end of the tube 1 buoyantly maintained in an elevated position relative to the bottom end 1b and with the fishing line protected from abrasion from a peripheral edge of the hole 7a in the sheet of ice 7.

According to one embodiment, an ice fishing line protection device comprises an elongated tube 1 with a top end 1a and a bottom end 1b, buoyancy means 6 attached to the tube 1 for maintaining the top end of the tube 1 in an elevated position relative to the bottom end 1b while the tube 1 is disposed in water, and means for extracting 10 the tube 1 from a hole 7a in a sheet of ice 7 that is filled with water. The tube 1 has an internal passageway 11 extending from the top end to the bottom end 1b through which a fishing line 2 may pass. The means for extracting 10 includes a linkage 10a extending upwardly from the tube 1 disposed in the hole 7a. The linkage 10a is accessible to a fisherman on top of the sheet of ice 7 and has a pole connector 12 that engages a fishing pole 28 of the fisherman so that the tube 1 can be extracted from the hole 7a in the sheet of ice 7 that is filled with water upon the fishing pole 28 being pulled away from the hole 7a with the pole connector 12 engaged thereto.

According to one embodiment, an ice fishing line protection device comprises an elongated tube 1 of variable length with a top end 1a and a bottom end 1b. The tube 1 has an internal passageway 11 extending from the top end to the bottom end through which a fishing line 2 may pass. The tube 1 has a top segment 18 comprising two top longitudinal sections 3 extending from the top end to a first medial end 14. Each of the two top longitudinal sections 3 has a first longitudinal side edge and a second longitudinal side edge: the first longitudinal side edge of one of the two top longitudinal sections is pivotally joined with the second longitudinal side edge of the other of the two top longitudinal sections, and the second longitudinal side edge of the one of the two top longitudinal sections is reversibly connected to the first longitudinal side edge of the other of the two longitudinal sections.

The tube 1 further has a bottom segment 20 comprising two bottom longitudinal sections 3 extending from a second medial end 16 to the bottom end 3b, each of the two bottom longitudinal sections 3 have a first longitudinal side edge and a second longitudinal side edge. The first longitudinal side edge of one of the two bottom longitudinal sections is pivotally joined with the second longitudinal side edge of the other of the two longitudinal sections. The second longitudinal side edge of the one of the two bottom longitudinal sections is reversibly connected to the first longitudinal side edge of the other of the two longitudinal sections. One of the top segment 18 and bottom segment 20 is slidably nested at least partially in the other of the top segment 18 and bottom segment 20.

Biasing means 8 for urging each of the second longitudinal side edges of the one of the two top longitudinal sections and the one of the two bottom longitudinal sections away from each of the first longitudinal side edges of the other of the two top longitudinal sections and the other of the two bottom longitudinal sections for opening the two top longitudinal sections 3a and the two bottom longitudinal sections 3b to an open position are further included, as well as buoyancy means 6 for maintaining the top end of the tube 1 in an elevated position relative to the bottom end 1b while the tube 1 is disposed in water. Means for reversibly connecting 5 the second longitudinal side edge of the one of the two longitudinal sections to the first longitudinal side edge of the other of the two longitudinal sections are provided. The means for reversibly connecting comprises an actuator 5a that is accessible to a fisherman on top of a sheet of ice 7 so that when the actuator 5a is engaged by the fisherman the second longitudinal side edge of the one of the two longitudinal sections is disconnected from the first longitudinal side edge of the other of the two longitudinal sections.

In this way, the second longitudinal side edge of the one of the two top longitudinal sections can be disconnected from the first longitudinal side edge of the other of the two top longitudinal sections and the second longitudinal side edge of the one of the two bottom longitudinal sections can be disconnected from the first longitudinal side edge of the other of the two bottom longitudinal sections, the first longitudinal side edge of one of the two top longitudinal sections can be urged by the biasing means 8 to pivot relative to the second longitudinal side edge of the other of the two top longitudinal sections and the first longitudinal side edge of one of the two bottom longitudinal sections can be urged by the biasing means 8 to pivot relative to the second longitudinal side edge of the other of the two bottom longitudinal sections to open the elongated tube 1 to allow a fishing line 2 to be reversibly disposed between the longitudinal sections 3, the first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube 1 with the fishing line 2 disposed in the passageway, the tube 1 can be extended so that the distance from the top end to the bottom end 1b is at least as large as a thickness of a sheet of ice 7 in which a hole 7a is cut for ice fishing, and the bottom end 1b of the tube 1 with the fishing line 2 disposed in the passageway can be inserted into the hole 7a in the sheet of ice 7 that is filled with water from a body of water under the ice, for ice fishing, with the top end 1a of the tube 1 buoyantly maintained at an elevation at least as high as the top surface of the sheet of ice 7 and the bottom end of the tube 1 buoyantly maintained at an elevation at or below the bottom surface of the sheet of ice to protect the fishing line 2 from abrasion from the peripheral edge of the hole in the sheet of ice.

Preferably, the ice fishing line protection device further comprising means for interlocking the top segment 18 and the bottom segment 20 so that the relative positions of the top segment 18 and the bottom segment 20 can be reversible fixed. Additionally, the bottom segment 20 may be at least partially nested in the top segment 18 and the buoyancy means 6 are attached to an exterior surface of the top segment 18 of the tube 1.

Another preferred aspect of the ice fishing line protection device of this meanful invention allows the bottom segment 20 of the tube 1 to be free of buoyancy means 6 and slidably extends downwardly into the water so that an extended length of the tube 1 is at least as large as a thickness of a sheet of ice 7.

Furthermore, the ice fishing line protection device may comprise a weighted element 22 disposed proximate the bottom end of the tube 1 to facilitate an upright disposition of the tube 1.

Figure 7:
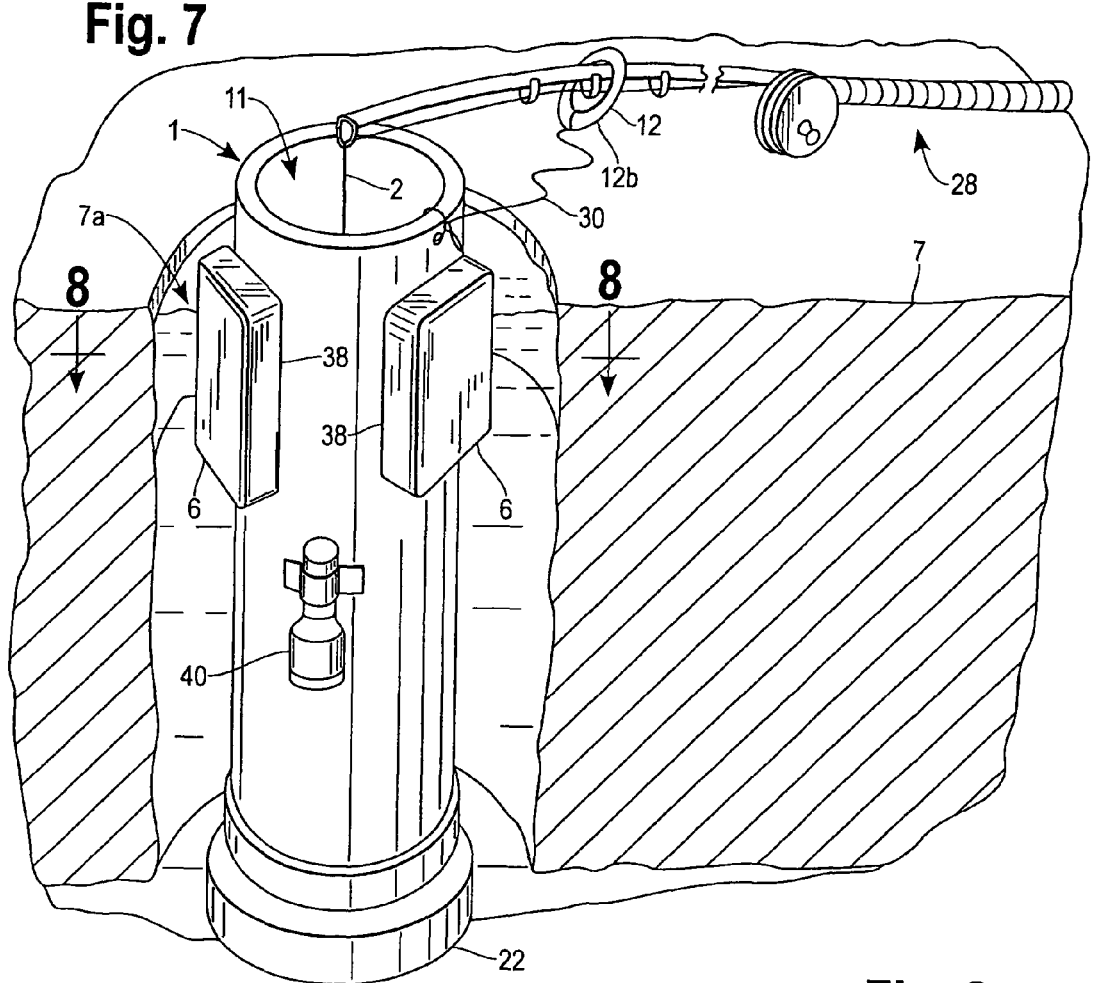
FIG. 7 is a perspective view of another embodiment of the present invention showing a continuous tube having means for extracting comprising one cord with buoyancy means comprising air chambers, and further comprising a means for illumination directed downwardly on one of the devices disposed in an ice hole.
Figure 8:
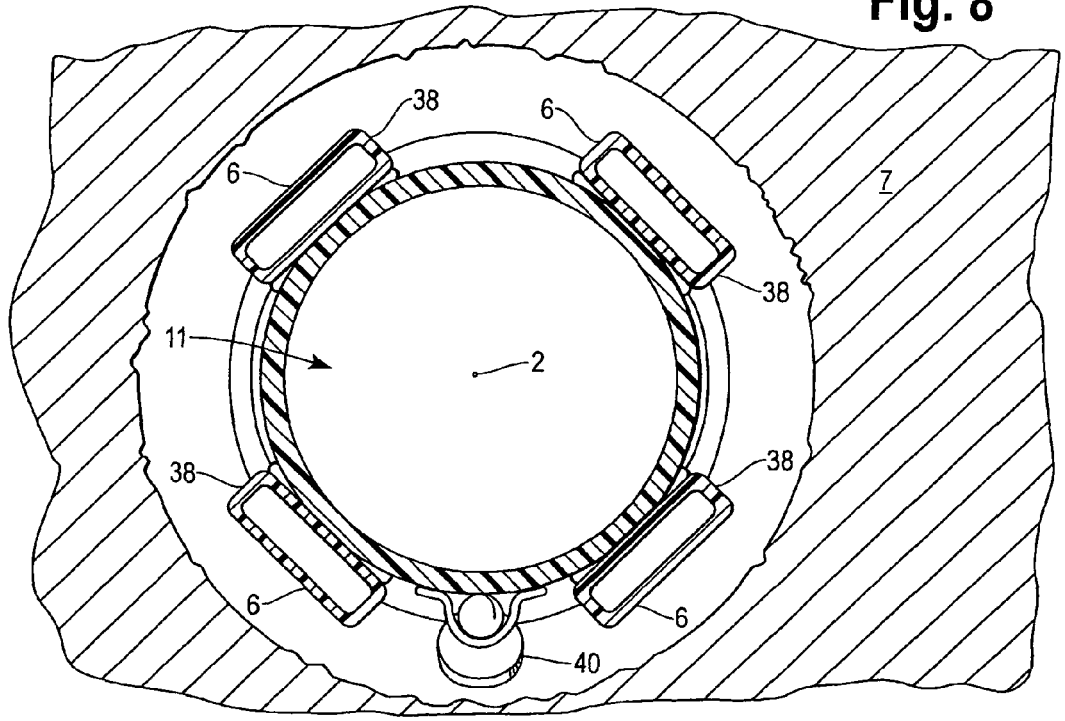
FIG. 8 is a cross sectional view taken along the lines of 8-8 of FIG. 7 showing the chamber in which the air is contained in the buoyancy means.
Figure 9:
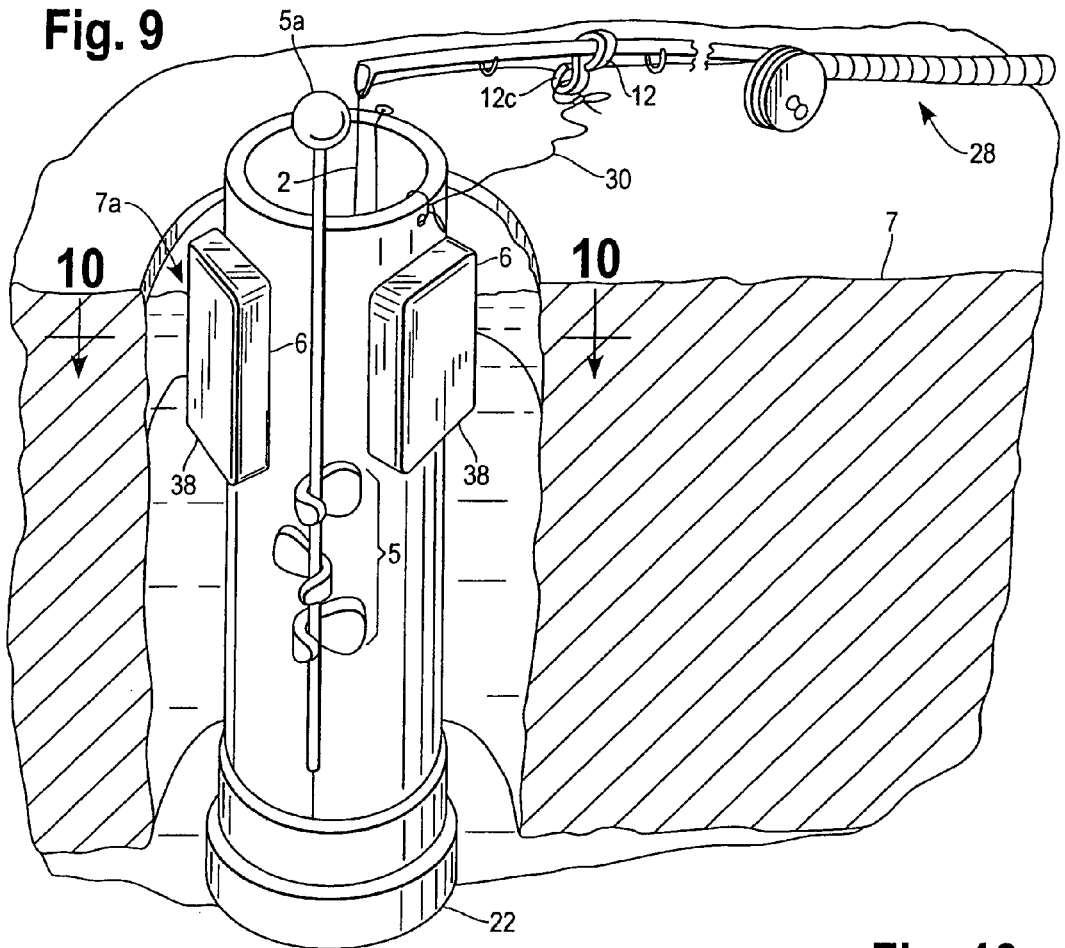
FIG. 9 is an embodiment of the ice fishing line protection device with the air chambers serving as buoyancy means and with an openable tube with means for extracting comprising one cord and a weighted element disposed proximate the bottom to assist keeping the tube in an upright position.
Figure 10:
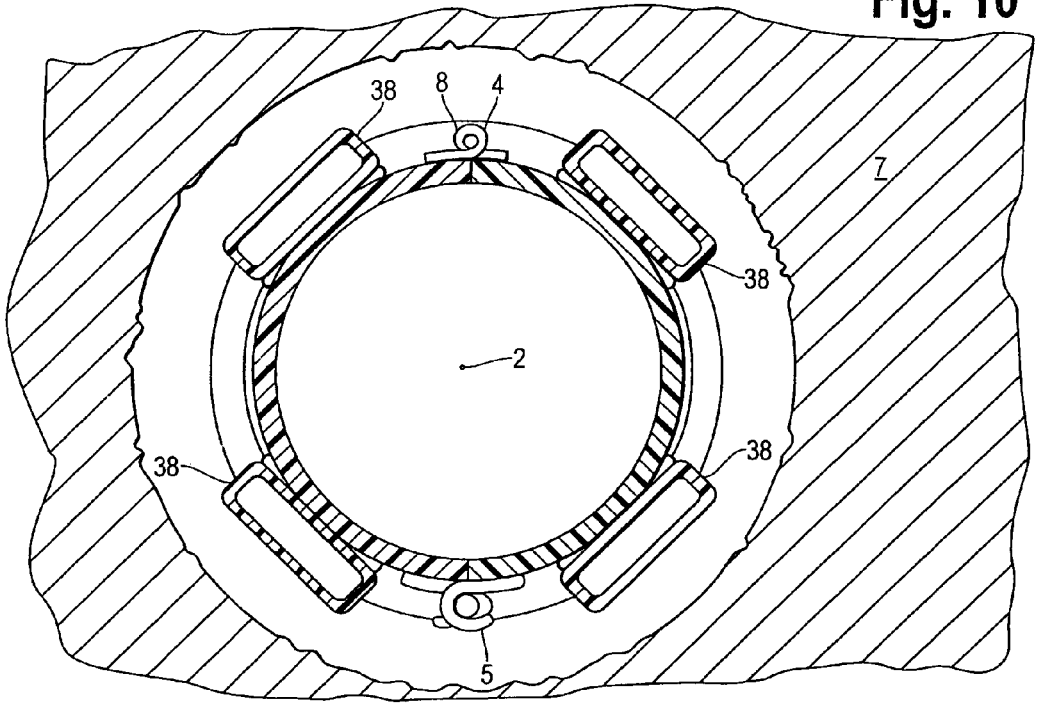
FIG. 10 is a cross sectional view taken along the line of 10-10 of FIG. 9 showing open air chambers of the buoyancy means and further showing a pair of facing edges of the respective portions of a hollow cylinders pivotally connected and the other pair of facing edges of the respective portions of a hollow cylinders reversible connected (with the actuator removed for clarity).

Another preferred aspect of the ice fishing line protection device of the current invention includes a top annular ring 24, a bottom annular ring 26 and a pole connector 12. The pole connector has means for engaging a fishing pole 28 and is fixedly connected to the bottom annular ring 26 by at least one flexible cord 30 (preferably two flexible cords). The at least one cord has the top annular ring 24 slidably attached between the pole connector and the bottom annular ring 26, and a first annular recess 32 is disposed on an interior surface of the top segment 18 of the tube 1 proximate the top end 1a for receiving the top annular ring 24, with a second annular recess 34 disposed on an interior surface of the bottom segment 20 of the tube 1 proximate the bottom end 1b for receiving the bottom annular ring 26, so that the top annular ring 24 can be disposed in the first annular recess 32 and the bottom annular ring 26 can be disposed in the second annular recess 34 while the tube 1 is in the open position and secured therein by closing tube 1. The tube 1 can be extended to an appropriate length for the thickness of the ice and the length secured by the means for interlocking, and the ice fishing line protection device can be extracted from the hole in the sheet of ice 7 by a fisherman raising a fishing pole 28 engaged to the pole connector 12 or by actuating the opening of the tube 1 to release the fishing line 2. As shown in FIGS. 1, 7, and 9 of the drawing, the pole connector 12 of the ice fishing line protection device comprises an element with one of a v-notch, a hook and a ring for engaging the fishing pole 28.

According to one embodiment of the ice fishing line protection device, the top end 1a of the tube 1 is buoyantly maintained at an elevation at least as high as the top surface of the sheet of ice 7 to protect the fishing line 2 from abrasion from the peripheral edge of the hole in the sheet of ice. Moreover, the bottom end of the tube 1 is preferably buoyantly maintained at an elevation at or below the bottom surface of the sheet of ice to protect the fishing line 2 from abrasion from the peripheral edge of the hole in the sheet of ice. The buoyancy means 6 for maintaining the top end 1a of the tube 1 in an elevated position relative to the bottom end 1b while the tube 1 is disposed in water may comprise a floatation device attached to an exterior surface of the elongated tube 1. The floatation device may comprise an element made of styrofoam 36, a sealed air chamber 38, or the like.

To aid the ice fisherman in fishing below the ice, the ice fishing line protection device may further include a light source 40 attached to an exterior surface of the elongated tube 1 with illuminance directed toward the bottom end 1b of the tube 1.

The elongated tube 1 of the ice fishing line protection device may be extendable from a first position in which the tube 1 is condensed to a second position in which the tube 1 is extended.

According to one embodiment, an ice fishing line protection device comprises an elongated tube 1 of variable length with a top end 1a and a bottom end 1b, biasing means 8, buoyancy means 6, means for reversibly connecting 5, means for interlocking, and a weighted element 22. The tube 1 has an internal passageway 11 extending from the top end 1a to the bottom end 1b through which a fishing line 2 may pass. The tube 1 has a top segment 18 comprising two top longitudinal sections extending from the top end 1a to a first medial end 14. Each of the two top longitudinal sections has a first longitudinal side edge and a second longitudinal side edge. The first longitudinal side edge of one of the two top longitudinal sections is pivotally joined with the second longitudinal side edge of the other of the two top longitudinal sections, and the second longitudinal side edge of the one of the two top longitudinal sections is reversibly connected to the first longitudinal side edge of the other of the two longitudinal sections.

The tube 1 further has a bottom segment 20 comprising two bottom longitudinal sections extending from a second medial end 16 to the bottom end 3b. Each of the two bottom longitudinal sections has a first longitudinal side edge and a second longitudinal side edge. The first longitudinal side edge of one of the two bottom longitudinal sections is pivotally joined with the second longitudinal side edge of the other of the two longitudinal sections and the second longitudinal side edge of the one of the two bottom longitudinal sections is reversibly connected to the first longitudinal side edge of the other of the two longitudinal sections. One of the top segment 18 and bottom segment 20 is slidably nested at least partially in the other of the top segment 18 and bottom segment 20. Preferably, the bottom segment 20 is at least partially nested in the top segment 18. The bottom segment 20 of the tube 1 slidably extends downwardly into the water so that an extended length of the tube 1 is at least as large as a thickness of a sheet of ice 7. A first annular recess 32 on an interior surface of the top segment 18 of the tube 1 proximate the top end 1a and a second annular recess 34 on an interior surface of the bottom segment 20 of the tube 1 proximate the bottom end are further provided.

The biasing means 8 urges each of the second longitudinal side edges of the one of the two top longitudinal sections 3a and the one of the two bottom longitudinal sections 3b away from each of the first longitudinal side edges of the other of the two top longitudinal sections and the other of the two bottom longitudinal sections for opening the two top longitudinal sections and the two bottom longitudinal sections to an open position are further provided. The buoyancy means 6 maintains the top end of the tube 1 in an elevated position relative to the bottom end while the tube 1 is disposed in water and the buoyancy means 6 are attached to an exterior surface of the top segment 18 of the tube 1 are provided. The bottom segment 20 of the tube 1 is free of buoyancy means 6.

The means for reversibly connecting 5 the second longitudinal side edge of the one of the two longitudinal sections to the first longitudinal side edge of the other of the two longitudinal sections are included. The means for reversibly connecting comprise an actuator 5a that is accessible to a fisherman on top of a sheet of ice 7 so that when the actuator 5a is engaged by the fisherman the second longitudinal side edge of the one of the two longitudinal sections is disconnected from the first longitudinal side edge of the other of the two longitudinal sections. Moreover, a top annular ring 24, a bottom annular ring 26 and a pole connector 12 are further provided. The pole connector has means for engaging a fishing pole 28 and is fixedly connected to the bottom annular ring 26 by at least one flexible cord 30. The at least one cord has the top annular ring 24 slidably attached between the pole connector and the bottom annular ring 26. The first annular recess 32 on the interior surface of the top segment 18 of the tube 1 proximate the top end receives the top annular ring 24 and the second annular recess 34 on the interior surface of the bottom segment 20 of the tube 1 proximate the bottom end 1b receives the bottom annular ring 26.

The weighted element 22 is disposed proximate the bottom end of the tube 1 to facilitate an upright disposition of the tube 1, and the means for interlocking interlocks the top segment 18 and the bottom segment 20 so that the relative positions of the top segment 18 and the bottom segment 20 can be reversible fixed.

Whereby, the top annular ring 24 can be disposed in the first annular recess 32 and the bottom annular ring 26 can be disposed in the second annular recess 34 while the tube 1 is in the open position and secured therein by closing the tube 1, the tube 1 can be extended to an appropriate length for the thickness of the ice and the length secured by the means for interlocking, and the ice fishing line protection device can be extracted from the hole in the sheet of ice 7 by a fisherman raising a fishing pole 28 engaged to the pole connector 12, furthermore, the second longitudinal side edge of the one of the two top longitudinal sections can be disconnected from the first longitudinal side edge of the other of the two top longitudinal sections and the second longitudinal side edge of the one of the two bottom longitudinal sections can be disconnected from the first longitudinal side edge of the other of the two bottom longitudinal sections, the first longitudinal side edge of one of the two top longitudinal sections can be urged by the biasing means 8 to pivot relative to the second longitudinal side edge of the other of the two top longitudinal sections and the first longitudinal side edge of one of the two bottom longitudinal sections can be urged by the biasing means 8 to pivot relative to the second longitudinal side edge of the other of the two bottom longitudinal sections to open the elongated tube 1 to allow a fishing line 2 to be reversibly disposed between the longitudinal sections 3, the first longitudinal side edge of the one of the two longitudinal sections can be pivoted about the hinge 4 relative to the second longitudinal side edge of the other of the two longitudinal section to reversibly connect the second longitudinal side edge of the one of the two longitudinal sections to the first longitudinal side edge of the other of the two longitudinal sections to close the elongated tube 1 with the fishing line 2 disposed in the passageway, the tube 1 can be extended so that the distance from the lop end to the bottom end is at least as large as a thickness of a sheet of ice 7 in which a hole 7a is cut for ice fishing, and the bottom end of the tube 1 with the fishing line 2 disposed in the passageway 11 can be inserted into the hole in the sheet of ice 7 that is filled with water from a body of water under the ice, for ice fishing, with the top end of the tube 1 buoyantly maintained at an elevation at least as high as the top surface of the sheet of ice and the bottom end 1b of the tube 1 buoyantly maintained at an elevation at or below the bottom surface of the sheet of ice to protect the fishing line 2 from abrasion from the peripheral edge of the hole in the sheet of ice 7.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing line protection device comprising: a. an elongated tube with a top end and a bottom end, i. said tube having an internal passageway extending from the top end to the bottom end through which a fishing line may pass, b.

buoyancy means attached to the tube for maintaining the top end of the tube in an elevated position relative to the bottom end while the tube is disposed in water, c. means for extracting the tube from a hole in a sheet of ice that is filled with water, i. said means for extracting including a linkage extending upwardly from the tube disposed in the hole, said linkage being accessible to a fisherman on top of the sheet of ice and having a pole connector that engages a fishing pole of the fisherman, whereby, the tube can be extracted from the hole in the sheet of ice that is filled with water upon the fishing pole being pulled away from the hole with the pole connector engaged thereto.

2. An ice fishing line protection device comprising: a. an elongated tube of variable length with a top end and a bottom end, i. said tube having an internal passageway extending from the top end to the bottom end through which a fishing line may pass, ii. said tube having a top segment comprising two top longitudinal sections extending from the top end to a first medial end, each of said two top longitudinal sections having a first longitudinal side edge and a second longitudinal side edge, (1) the first longitudinal side edge of one of the two top longitudinal sections is pivotally joined with the second longitudinal side edge of the other of the two top longitudinal sections, (2) the second longitudinal side edge of the one of the two top longitudinal sections is reversibly connected to the first longitudinal side edge of the other of the two longitudinal sections, iii. said tube further having a bottom segment comprising two bottom longitudinal sections extending from a second medial end to the bottom end, each of said two bottom longitudinal sections having a first longitudinal side edge and a second longitudinal side edge, (1) the first longitudinal side edge of one of the two bottom longitudinal sections is pivotally joined with the second longitudinal side edge of the other of the two longitudinal sections, (2) the second longitudinal side edge of the one of the two bottom longitudinal sections is reversibly connected to the first longitudinal side edge of the other of the two longitudinal sections, iv. one of the top segment and bottom segment is slidably nested at least partially in the other of the top segment and bottom segment; b. biasing means for urging each of the second longitudinal side edges of the one of the two top longitudinal sections and the one of the two bottom longitudinal sections away from each of the first longitudinal side edges of the other of the two top longitudinal sections and the other of the two bottom longitudinal sections for opening said two top longitudinal sections and said two bottom longitudinal sections to an open position; c. buoyancy means for maintaining the top end of the tube in an elevated position relative to the bottom end while the tube is disposed in water, d. means for reversibly connecting the second longitudinal side edge of the one of the two longitudinal sections to the first longitudinal side edge of the other of the two longitudinal sections, i. said means for reversibly connecting comprising an actuator that is accessible to a fisherman on top of a sheet of ice so that when the actuator is engaged by the fisherman the second longitudinal side edge of the one of the two longitudinal sections is disconnected from the first longitudinal side edge of the other of the two longitudinal sections, whereby, the second longitudinal side edge of the one of the two top longitudinal sections can be disconnected from the first longitudinal side edge of the other of the two top longitudinal sections and the second longitudinal side edge of the one of the two bottom longitudinal sections can be disconnected from the first longitudinal side edge of the other of the two bottom longitudinal sections, the first longitudinal side edge of one of the two top longitudinal sections can be urged by the biasing means to pivot relative to the second longitudinal side edge of the other of the two top longitudinal sections and the first longitudinal side edge of one of the two bottom longitudinal sections can be urged by the biasing means to pivot relative to the second longitudinal side edge of the other of the two bottom longitudinal sections to open the elongated tube to allow a fishing line to be reversibly disposed between said longitudinal sections, the first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube with the fishing line disposed in the passageway, the tube can be extended so that the distance from the top end to the bottom end is at least as large as a thickness of a sheet of ice in which a hole is cut for ice fishing, and the bottom end of the tube with the fishing line disposed in the passageway can be inserted into the hole in the sheet of ice that is filled with water from a body of water under the ice, for ice fishing, with the top end of the tube buoyantly maintained at an elevation at least as high as the top surface of the sheet of ice and the bottom end of the tube buoyantly maintained at an elevation at or below the bottom surface of the sheet of ice to protect the fishing line from abrasion from the peripheral edge of the hole in the sheet of ice.

3. The ice fishing line protection device of claim 2, further comprising means for interlocking the top segment and the bottom segment so that the relative positions of the top segment and the bottom segment can be reversible fixed.

4. The ice fishing line protection device of claim 2, in which the bottom segment is at least partially nested in the top segment and the buoyancy means are attached to an exterior surface of the top segment of the tube.

5. The ice fishing line protection device of claim 4, in which the bottom segment of the tube is free of buoyancy means and slidably extends downwardly into the water so that an extended length of the tube is at least as large as a thickness of a sheet of ice.

6. The ice fishing line protection device of claim 2, further comprising a weighted element disposed proximate the bottom end of the tube to facilitate an upright disposition of the tube.

7. The ice fishing line protection device of claim 2, further comprising: a. a top annular ring, a bottom annular ring and a pole connector, i. said pole connector having means for engaging a fishing pole and being fixedly connected to the bottom annular ring by at least one flexible cord, ii. said at least one cord having the top annular ring slidably attached between the pole connector and the bottom annular ring; and b. a first annular recess on an interior surface of the top segment of the tube proximate the top end for receiving the top annular ring, c. a second annular recess on an interior surface of the bottom segment of the tube proximate the bottom end for receiving the bottom annular ring, whereby, the top annular ring can be disposed in the first annular recess and the bottom annular ring can be disposed in the second annular recess while the tube is in the open position and secured therein by closing tube, the tube can be extended to an appropriate length for the thickness of the ice and the length secured by the means for interlocking, and the ice fishing line protection device can be extracted from the hole in the sheet of ice by a fisherman raising a fishing pole engaged to the pole connector.

8. The ice fishing line protection device of claim 7, in which the pole connector comprises an element with one of a v-notch, a hook and a ring for engaging the fishing pole.

9. The ice fishing line protection device of claim 7, in which the at least on cord comprises two flexible cords.

10. The ice fishing line protection device of claim 2, in which the top end of the tube is buoyantly maintained at an elevation at least as high as the top surface of the sheet of ice to protect the fishing line from abrasion from the peripheral edge of the hole in the sheet of ice.

11. The ice fishing line protection device of claim 2, in which the bottom end of the tube is buoyantly maintained at an elevation at or below the bottom surface of the sheet of ice to protect the fishing line from abrasion from the peripheral edge of the hole in the sheet of ice.

12. The ice fishing line protection device of claim 2, in which the buoyancy means for maintaining the top end of the tube in an elevated position relative to the bottom end while the tube is disposed in water comprise a floatation device attached to an exterior surface of the elongated tube.

13. The ice fishing line protection device of claim 2, in which the floatation device comprises an element made of styrofoam.

14. The ice fishing line protection device of claim 13, in which the floatation device comprises a sealed air chamber.

15. The ice fishing line protection device of claim 2, further comprising a light source attached to an exterior surface of the elongated tube with illuminance directed toward the bottom end of the tube.

16. The ice fishing line protection device of claim 2, in which the elongated tube is extendable from a first position in which the tube is condensed to a second position in which the tube is extended.

17. An ice fishing line protection device comprising: a. an elongated tube of variable length with a top end and a bottom end, the tube has an internal passageway extending from the top end to the bottom end through which a fishing line may pass, i. the tube has a top segment comprising two top longitudinal sections extending from the top end to a first medial end, each of the two top longitudinal sections have a first longitudinal side edge and a second longitudinal side edge, (1) the first longitudinal side edge of one of the two top longitudinal sections is pivotally joined with the second longitudinal side edge of the other of the two top longitudinal sections, (2) the second longitudinal side edge of the one of the two top longitudinal sections is reversibly connected to the first longitudinal side edge of the other of the two longitudinal sections, ii. the tube further have a bottom segment comprising two bottom longitudinal sections extending from a second medial end to the bottom end, each of the two bottom longitudinal sections have a first longitudinal side edge and a second longitudinal side edge, (1) the first longitudinal side edge of one of the two bottom longitudinal sections is pivotally joined with the second longitudinal side edge of the other of the two longitudinal sections, (2) the second longitudinal side edge of the one of the two bottom longitudinal sections is reversibly connected to the first longitudinal side edge of the other of the two longitudinal sections, iii. one of the top segment and bottom segment is slidably nested at least partially in the other of the top segment and bottom segment (1) the bottom segment is at least partially nested in the top segment, (2) the bottom segment of the tube slidably extends downwardly into the water so that an extended length of the tube is at least as large as a thickness of a sheet of ice, iv. a first annular recess on an interior surface of the top segment of the tube proximate the top end and a second annular recess on an interior surface of the bottom segment of the tube proximate the bottom end; b. biasing means for urging each of the second longitudinal side edges of the one of the two top longitudinal sections and the one of the two bottom longitudinal sections away from each of the first longitudinal side edges of the other of the two top longitudinal sections and the other of the two bottom longitudinal sections for opening the two top longitudinal sections and the two bottom longitudinal sections to an open position; c. buoyancy means for maintaining the top end of the tube in an elevated position relative to the bottom end while the tube is disposed in water and the buoyancy means are attached to an exterior surface of the top segment of the tube i. the bottom segment of the tube is free of buoyancy means; d. means for reversibly connecting the second longitudinal side edge of the one of the two longitudinal sections to the first longitudinal side edge of the other of the two longitudinal sections, i. the means for reversibly connecting comprising an actuator that is accessible to a fisherman on top of a sheet of ice so that when the actuator is engaged by the fisherman the second longitudinal side edge of the one of the two longitudinal sections is disconnected from the first longitudinal side edge of the other of the two longitudinal sections; e. a top annular ring, a bottom annular ring and a pole connector, i. the pole connector have means for engaging a fishing pole and is fixedly connected to the bottom annular ring by at least one flexible cord, ii. the at least one cord has the top annular ring slidably attached between the pole connector and the bottom annular ring, iii. the first annular recess on the interior surface of the top segment of the tube proximate the top end receives the top annular ring, iv. the second annular recess on the interior surface of the bottom segment of the tube proximate the bottom end receives the bottom annular ring; f. a weighted element is disposed proximate the bottom end of the tube to facilitate an upright disposition of the tube; and g. means for interlocking the top segment and the bottom segment so that the relative positions of the top segment and the bottom segment can be reversible fixed, whereby, the top annular ring can be disposed in the first annular recess and the bottom annular ring can be disposed in the second annular recess while the tube is in the open position and secured therein by closing the tube, the tube can be extended to an appropriate length for the thickness of the ice and the length secured by the means for interlocking, and the ice fishing line protection device can be extracted from the hole in the sheet of ice by a fisherman raising a fishing pole engaged to the pole connector, furthermore, the second longitudinal side edge of the one of the two top longitudinal sections can be disconnected from the first longitudinal side edge of the other of the two top longitudinal sections and the second longitudinal side edge of the one of the two bottom longitudinal sections can be disconnected from the first longitudinal side edge of the other of the two bottom longitudinal sections, the first longitudinal side edge of one of the two top longitudinal sections can be urged by the biasing means to pivot relative to the second longitudinal side edge of the other of the two top longitudinal sections and the first longitudinal side edge of one of the two bottom longitudinal sections can be urged by the biasing means to pivot relative to the second longitudinal side edge of the other of the two bottom longitudinal sections to open the elongated tube to allow a fishing line to be reversibly disposed between the longitudinal sections, the first longitudinal side edge of the one of the two longitudinal sections can be pivoted relative to the second longitudinal side edge of the other of the two longitudinal section to reversibly connect the second longitudinal side edge of the one of the two longitudinal sections to the first longitudinal side edge of the other of the two longitudinal sections to close the elongated tube with the fishing line disposed in the passageway, the tube can be extended so that the distance from the top end to the bottom end is at least as large as a thickness of a sheet of ice in which a hole is cut for ice fishing, and the bottom end of the tube with the fishing line disposed in the passageway can be inserted into the hole in the sheet of ice that is filled with water from a body of water under the ice, for ice fishing, with the top end of the tube buoyantly maintained at an elevation at least as high as the top surface of the sheet of ice and the bottom end of the tube buoyantly maintained at an elevation at or below the bottom surface of the sheet of ice to protect the fishing line from abrasion from the peripheral edge of the hole in the sheet of ice.

* * * * *